United States Patent [19]

Matsumura et al.

[11] 3,925,793
[45] Dec. 9, 1975

[54] EYE FUNDUS CAMERA WITH FOCUS SETTING DEVICE

[75] Inventors: Isao Matsumura, Yokohama; Yoshimi Kohayakawa, Tokyo, both of Japan

[73] Assignee: Canon Kabushiki Kaisha, Tokyo, Japan

[22] Filed: Mar. 28, 1974

[21] Appl. No.: 455,945

[30] Foreign Application Priority Data
Mar. 31, 1973 Japan............................ 48-36215

[52] U.S. Cl. ............................ 354/62; 351/6; 351/7
[51] Int. Cl.² ........................................ G03B 29/00
[58] Field of Search ................... 354/62; 351/7, 6

[56] References Cited
UNITED STATES PATENTS
3,016,000  1/1962  Noyori ............................ 351/7 X
3,524,702  8/1970  Bellows ............................. 351/6
3,536,384  10/1970  Cocks ............................... 351/6

Primary Examiner—Monroe H. Hayes
Attorney, Agent, or Firm—Toren, McGeady and Stanger

[57] ABSTRACT

The present invention relates to an eye fundus camera with mark projecting optics which projects a mark on the eye fundus in order to facilitate the focus setting.

The present invention further relates to a focus setting device for an eye fundus camera in which by means of a split image prism placed in front of the narrow slit shaped mark, the beam from a light source of a mark projecting optics is divided into two beams after having passed the above mentioned mark, and directed into the light path of the illuminating optics and of the photographing observation optics through a semipermeable mirror. In this manner, the focus setting is carried out under observation by means of the finder optics in such a manner that the two beams projected on the eye fundus coincide with each other.

9 Claims, 7 Drawing Figures

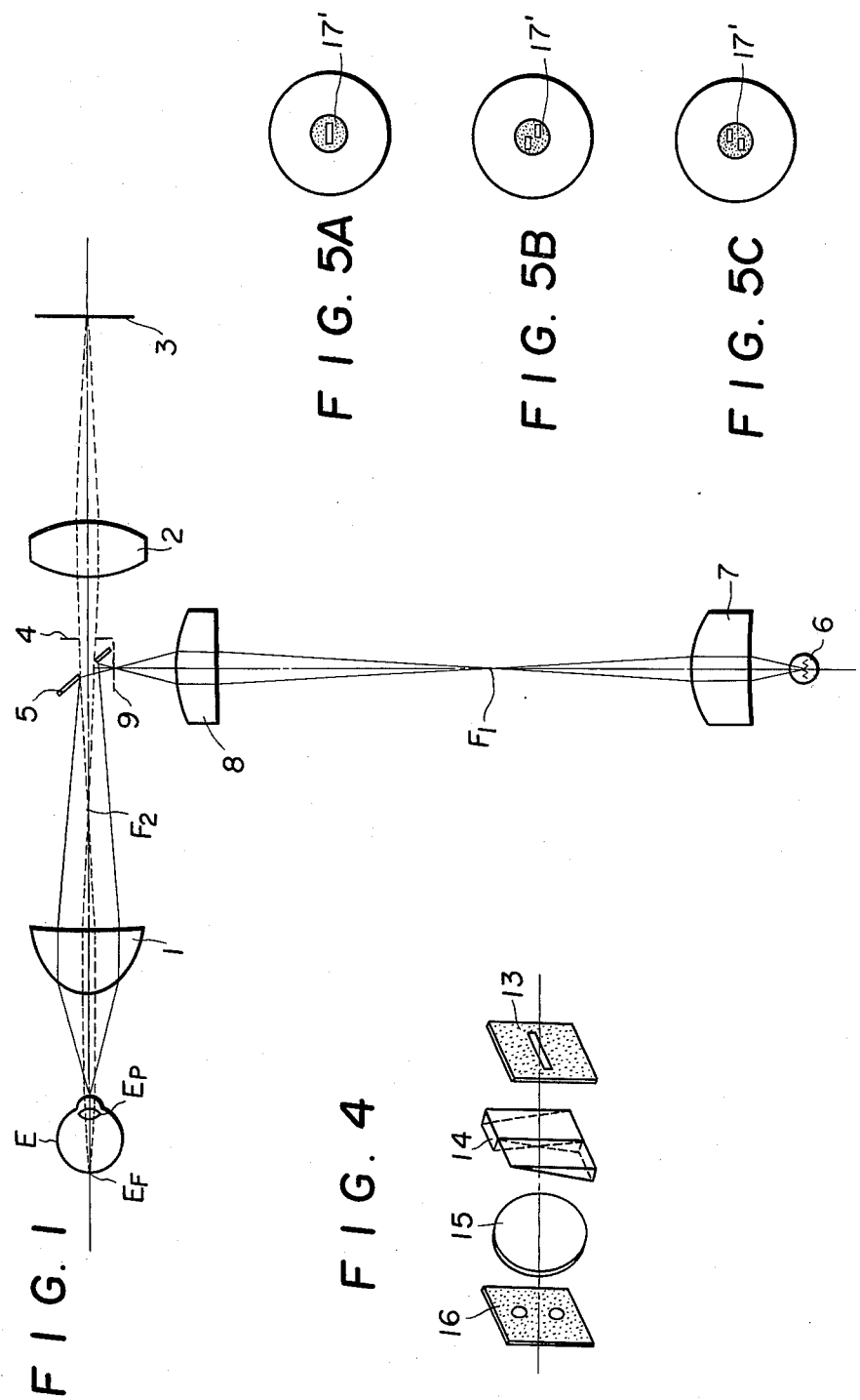

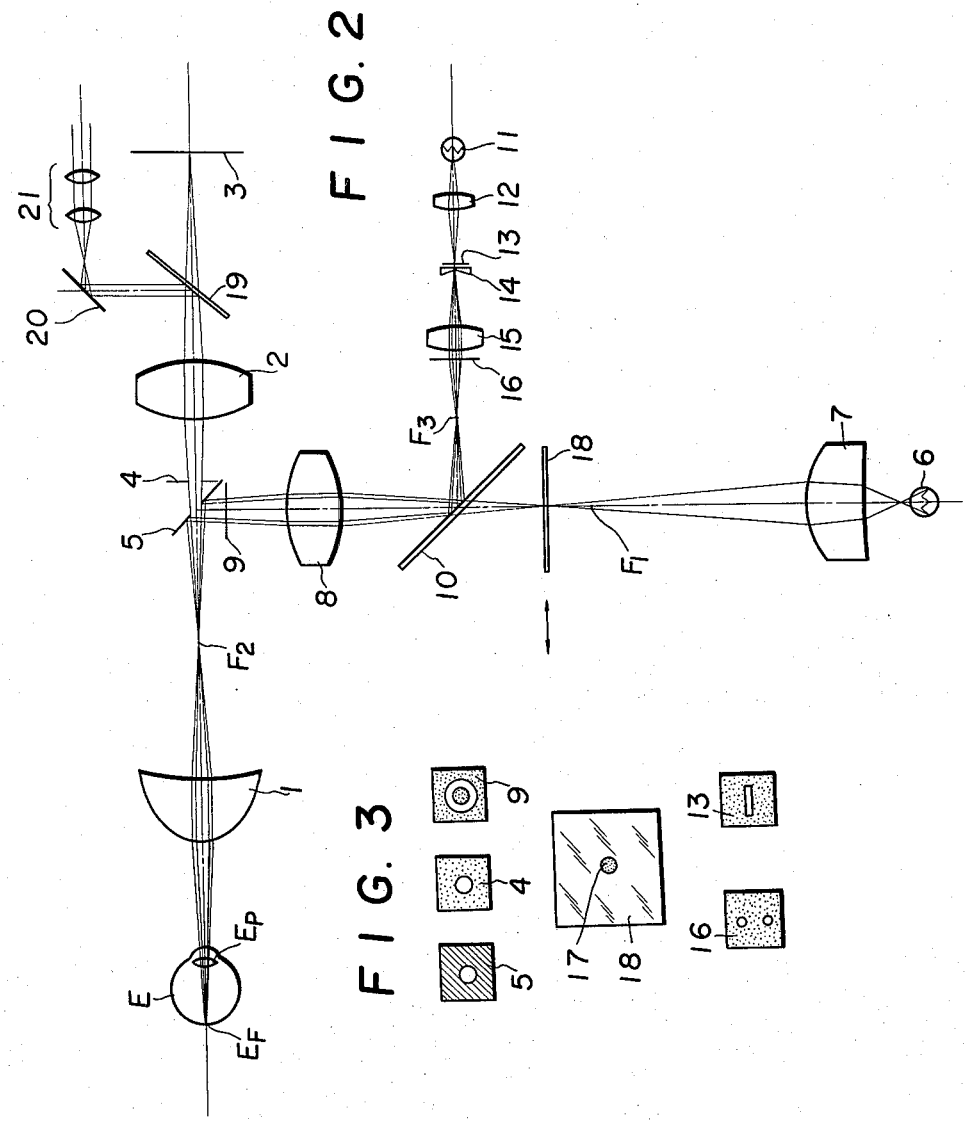

EYE FUNDUS CAMERA WITH FOCUS SETTING DEVICE

BACKGROUND OF THE INVENTION

1. Field of the Invention

The present invention relates to a focus setting device for an eye fundus camera.

2. Description of the Prior Art

Until now the focus setting of an eye fundus camera has been made by means of the photographing optics and the finder optics while the image on the eye fundus is observed directly, whereby not only does it require much skill to determine the object but also it is very inconvenient when it is hard to obtain a clear object such as veins on the eye fundus which are disturbed due to a sickness.

BRIEF SUMMARY OF INVENTION

The present invention provides an eye fundus camera in which the focus setting can be carried out easily, for example, even when there is a disturbance on the eye fundus due to a sickness, by introducing a projecting optics presenting mark into the eye fundus illuminating optics in such a manner that the focus setting is carried out by means of the image of the mark projected on the eye fundus.

BRIEF DESCRIPTION OF DRAWING

FIG. 1 shows the disposition and the light path of a conventional eye fundus camera optics.

FIG. 2 shows an embodiment of the eye fundus camera presenting the focus setting device according to the present invention.

FIG. 3 is a front view of the composing members of the eye fundus camera shown in FIG. 2.

FIG. 4 show the important parts of the mark projecting optics in perspective view.

FIG. 5A, 5B and 5C respectively show a state of the image of the mark projected on the eye fundus.

DETAILED DESCRIPTION

FIG. 1 shows the disposition and the light path of conventional eye fundus camera optics. In the drawing, 1 is the objective, 2 the photographing lens acting as relay toward the objective 1, 3 the film surface, 4 the diaphragm, 5 the illumination light introducing mirror disposed obliquely to the light path for observing and photographing eye fundus and presenting at the center an opening allowing the light to pass, 7 the condenser lens, 8 the relay lens and 9 the ring slit. The light coming from the light source 6 is once focussed at $F_1$ by means of the condenser lens 7, then refocussed on the ring slit 9 by means of the relay lens 8, reflected from the obliquely disposed mirror 5 having an opening and is focussed on the pupil $E_p$ of the eye to be examined by means of the objective so as to illuminate the eye fundus $E_F$. The light coming from the illuminated eye fundus is focussed at $F_2$ in the neighborhood of the rear focus plane behind the objective 1 after having passed through the reflection optics of the eye E to be examined and the objective 1 and finally forms an image of the eye fundus $E_F$ on the film surface 3 by means of the photographing lens 2 after having passed through the opening of the mirror 5 and the diaphragm 4.

So far the function of a conventional eye fundus camera is explained, while according to the present invention by means of the semipermeable mirror obliquely disposed to the light path of the illumination optics of the above mentioned eye fundus camera, the light coming from the mark projecting optics to be explained later is directed into the light path of the illumination optics and the photographing optics and projects the image of the mark on the eye fundus in such a manner that the focus setting can be carried out easily. Below the gist of the present invention will be explained according to FIG. 2–5. FIG. 2 shows an embodiment of the eye fundus camera presenting the focus setting device according to the present invention, while FIG. 3 is a front view of the composing members of the eye fundus camera shown in FIG. 2. Further the same composing members as those of the conventional eye fundus camera shown in FIG. 1 have the same numerical figure. The relay lens 8 of the illumination optics, being considered equivalent to the photographing lens 2 of the photographing optics, is disposed at the same distance with regard to the mirror 5 presenting an opening, while closer to the light source 6 than to the above mentioned relay lens 8 in the light path the semipermeable mirror 10 leading the light coming from the mark projecting optics into the illumination optics and the observation and photographing optics is obliquely disposed. Further it is also possible that between the above mentioned objective 1 and the above mentioned mirror 5 with an opening, a semipermeable mirror is obliquely disposed so as to direct the light coming from the mark projecting optics into the observation photographing optics.

The mark projecting optics consists of the light source 11, the condenser lens 12, the narrow slit shaped mark 13 disposed at the position at which the image of the light source 11 is formed by means of the condenser lens 2, the split image prism 14 disposed close to the mark 13, the relay lens 15 and the diaphragm plate 16 with two openings. FIG. 4 shows the important parts of the above mentioned mark projecting optics in an enlarged perspective view. It is so designed that the image of the mark 13 is, by means of the relay lens 15, formed on the $F_3$ plane at the position conjugate to the film plane 3 with regard to the mirror 5 with an opening, while the diaphragm plate 16 with two openings is placed at the position at which the image of the ring slit 9 is formed by means of the relay lens 8, whereby the distance between the openings of the diaphragm plate 16 is chosen equal to the diameter of the ring image of the above mentioned ring slit 9. Although the mark 13 is hereby intended to be projected on the eye fundus $E_F$ to form an image, in order to prevent the image of the mark formed on the eye fundus from being obscured due to the light coming from the illumination optics, a thin transparent glass plate 18 presenting a light shielding part 17 (in FIG. 3) large enough to cover the image of the mark formed on the eye fundus is disposed at a position conjugate to $F_3$ with regard to the semipermeable mirror 10 in the illumination optics in such a manner that the above mentioned thin glass plate 18 can freely be put into and out of the light path. Apart from above in order to obtain a clear image of the marked on the eye fundus $E_F$ either an opening large enough to cover the image of the mark is provided at the center of the semipermeable mirror 10 or a reflector large enough to cover the image of the mark is adopted instead of the semipermeable mirror.

Below the method how to carry out the focus setting by means of the mark projecting optics is explained. The light coming from the mark 13 is divided into two beams by means of the split image prism 14, which beams pass respectively through the two openings of the diaphragm plate 16 and reach the eye fundus $E_F$ after having passed through the relay lens 8 and the objective 1 so as to form the image of the mark 13 on the eye fundus $E_F$. When in this case it is duly in focus, in the image 17' of the light shielding part 17 in the transparent glass 18, a similar line as the original of the mark 13 appears as shown in FIG. 5A when it is out of focus, separated images appears in accordance with the angle at which the two openings of the image of the diaphragm plate 16 formed on the pupil $E_p$ look at a point on the eye fundus $E_F$ as shown in FIG. 5B and FIG. 5C. Thus the focus setting can be carried out, by observing the image of the mark formed on the eye fundus $E_F$ by means of the usual finder optics such as the finder mirror 19 movably and obliquely disposed in the light path between the photographing lens 2 and the film surface 3, the light path turning mirror 20, the eye piece 21 and so on and moving the photographing lens 2 and the relay lens 8 respectively the film surface 3 and the mark projecting optics comprising $F_3$ in the conjugate plane in such a manner that the image of the mark is focussed on the eye fundus $E_F$ as shown in 5A namely the film surface 3 and $F_3$ in the conjugate plane come to conjugate image positions to each other with regard to the beam from the eye fundus $E_F$.

In case of taking a photograph, the projection of the mark by means of the mark projecting optics is stopped while the transparent glass plate 18 presenting the light shielding part is removed from the illumination light path and further the finder mirror 19 is removed from the observation photographing path. Further at the position intended for film surface 3, photoelectric image pick-up optics can be placed instead of film so as to observe the image of the eye fundus by means of a cathode ray tube being connected with the photoelectric image pick-up optics as substitute for finder optics.

As mentioned above, by means of the device according to the present invention it can be judged whether it is in focus or not by observing the image of the mark projected on the eye fundus whether the image is separated or not, so that the observation by means of the device according to the present invention is by far easier than that by means of the direct observation of the eye fundus $E_F$, whereby an exact focus setting can be carried out efficiently, because the parallax in forward and backward direction, which is apt to take place when the image formed in the air of the eye fundus is observed by means of a finder, can also be eliminated.

We claim:

1. An eye fundus camera having a focus setting device, comprising:
    photographing optics having an objective, a first reflection member, a first relay lens, and a photographing plane in said order from an eye to be inspected;
    illuminating optics having a light source, a condenser lens, and a second relay lens for directing a beam onto an eye fundus through said first reflection member;
    mark projection optics having a mark element, beam splitting means to separate the beam coming from said mark into a pair of beams, a beam diaphragm plate to limit each of said beams and an optical means for imaging the separated beams coming from said beam diaphragm plate; and
    a second reflection member being obliquely disposed on an optical axis of the first reflection member and the condenser lens of said illuminating optics to direct the beam from said mark projection optics into the illuminating optics;
    wherein said photographing plane has a conjugate relationship with the imaging plane of the separated beams from the beam diaphragm plate in the mark projection optics, and wherein said beam diaphragm plate in the mark projection optics and the pupil plane of an eye to be inspected are in an imaging position relationship.

2. An eye fundus camera according to claim 1, in which said first relay lens and the second relay lens are at positions having equal distance from the first reflection member and wherein said lenses have equivalent material.

3. An eye fundus camera according to claim 2, in which a semipermeable reflector is disposed as said second reflection member between the second relay lens and the imaging plane of the separated beams in said mark projection optics, and a thin transparent glass plate having a light shielding plate large enough to cover the mark image from the mark projection optics is disposed at a position having the same distance as from said separated beam imaging plane to said semipermeable reflector, said plate being disposed within the illuminating optical path between the illuminating light source and said semipermeable reflector, said glass plate being disposed in such manner that said plate can be freely inserted and removed from the illuminating optical path.

4. An eye fundus camera according to claim 2, in which a perforated semipermeable reflector is disposed as said second reflection member between said second relay lens and the imaging plane of the separated beam in the mark projection optics.

5. An eye fundus camera according to claim 2, in which a reflector is disposed as said second reflection member between said second relay lens and the imaging plane of the separated beam in the mark projection optics.

6. An eye fundus camera according to claim 3, in which a two-hole diaphragm plate is disposed as said beam diaphragm plate in said mark projection optics, and a ring slit having such diameter as almost equals the separating space between two holes of said two-hole diaphragm plate is disposed between said first reflection member and the second relay lens, and at a conjugate position with the two-hole diaphragm plate with respect to the second relay lens.

7. An eye fundus camera having a focus setting device, comprising:
    photographing optics having an objective lens, a first reflection member, a first relay lens and a photographing plane;
    an illuminating optics having a light source, a condenser lens and a second relay lens for directing a beam onto an eye fundus through said first reflection member;
    mark projection optics having a mark, a beam separating means to separate the beam coming from said mark into a pair of beams, a beam diaphragm plate to limit each of said separated beams, and an optical means to image said separated beam from said beam diaphragm plate; and
    a second reflection member being obliquely disposed on an optical axis of the objective lens and the first reflection member of said photographing optics to direct the beam from said mark projection optics to an eye to be inspected; and wherein said photographing plane is, in reference to said second reflection member, in a conjugate relationship with the imaging plane of the separated beams from the beam diaphragm plate in the mark projection optics, and said beam diaphragm plate in the mark projection optics is in an imaging position relationship with the pupil of an eye to be inspected.

8. An eye fundus camera according to claim 7, in which said first relay lens and the second relay lens can be shifted for focus setting by the said mark projected onto an eye fundus.

9. An eye fundus camera according to claim 7, in which the mark projection optics which contains said separated beam imaging point, which is in a conjugate position with said photographing plane, is shiftable for focus setting by said mark being projected on the eye fundus.

* * * * *